(12) United States Patent
Gudnason

(10) Patent No.: US 7,903,832 B2
(45) Date of Patent: Mar. 8, 2011

(54) SYSTEM AND METHOD FOR DRIVING AN ANTENNA

(75) Inventor: Gunnar Gudnason, Smørum (DK)

(73) Assignee: Oticon A/S, Smorum (DK)

( * ) Notice: Subject to any disclaimer, the term of this patent is extended or adjusted under 35 U.S.C. 154(b) by 1176 days.

(21) Appl. No.: 11/582,317

(22) Filed: Oct. 18, 2006

(65) Prior Publication Data

US 2007/0116146 A1    May 24, 2007

(30) Foreign Application Priority Data

Oct. 20, 2005  (EP) .................................. 05109780

(51) Int. Cl.
*H04R 25/00* (2006.01)
*H04L 27/00* (2006.01)
(52) U.S. Cl. ........................................ 381/315; 375/259
(58) Field of Classification Search .................. 381/312, 381/315; 375/259, 268; 455/39, 41.1, 41.2
See application file for complete search history.

(56) References Cited

U.S. PATENT DOCUMENTS

| 5,276,910 | A | 1/1994 | Buchele |
| 5,615,229 | A | 3/1997 | Sharma et al. |
| 6,351,472 | B1 | 2/2002 | Meyer |
| 2005/0089183 | A1 | 4/2005 | Niederdrank et al. |
| 2005/0110700 | A1 | 5/2005 | Terry |

FOREIGN PATENT DOCUMENTS

| WO | WO 97/15125 A1 | 4/1997 |
| WO | WO 00/31891 A1 | 6/2000 |
| WO | WO 02/41086 A3 | 5/2002 |

*Primary Examiner* — Brian Ensey
(74) *Attorney, Agent, or Firm* — Birch, Stewart, Kolasch & Birch, LLP

(57) ABSTRACT

The present invention relates to a system (100) and method for driving an antenna (118). The system (100) comprises a driving means (110, 112, 114) driving the antenna (118) with a driving signal. The system (100) further comprises a modulation means (102) having an input receiving a transmission data signal (106), a data identification means (122) identifying a level change in the transmission data signal (106) and controlling duty cycle of the driving signal (108). The data identification means (122) provides a timed increase of duty cycle of the driving signal (108) when the a level change in said transmission data is identified.

13 Claims, 2 Drawing Sheets

SYSTEM AND METHOD FOR DRIVING AN ANTENNA

FIELD OF INVENTION

This invention relates to a system and method for driving an antenna, in particular driving an inductive antenna by amplitude modulation for example used in a hearing aid system communicating between a set of hearing aids or between either of a set of hearing aids and an accessory element.

BACKGROUND OF INVENTION

State of art communication systems such as the method and device disclosed in American patent application no.: US 2005/0089183, which hereby is incorporated in the below specification by reference, generally utilise an inductive link operating at a very low data rate so as to avoid large power requirements. The method and device disclosed in the patent application prioritizes between types of data packages so as to, for example, enable a remote control unit to interrupt communication between a set of hearing aids.

Inductive links, which in this context are to be construed as magnetic links, are generally used for short-range wireless communication between a set of hearing aids, or between a hearing aid and an accessory element such as a Bluetooth gateway, remote control or the like. However, because of the limited power available to a hearing aid due to the small battery, it is desirable to have an antenna, which is as power-efficient as possible. That is an antenna, which generates as much magnetic field as possible with the lowest current consumption.

The limiting factor is a basic trade off between power efficiency and antenna bandwidth. An antenna designed for low loss results in antennas having small bandwidth and consequently an insufficient data transfer rate. On the other hand, an antenna designed for a small bandwidth results in envelopes of transmitted signals not changing fast enough to carry the desired modulation, i.e. a receiver cannot register that a bit has been sent before a subsequent bit is to be transmitted.

SUMMARY OF THE INVENTION

An object of the present invention is to provide a system and method for providing a high data rate in a communication link while using an antenna commensurate with limited available power.

It is a further object of the present invention to provide a hearing aid system capable of providing a high data transfer rate between a set of hearing aids or between an accessory and any of the set of hearing aids.

A particular advantage of the present invention is the provision of an increased data transfer rate without the introduction of a significant increase in power consumption.

The above objects and advantage together with numerous other objects, advantages and features, which will become evident from below detailed description, are obtained according to a first aspect of the present invention by a system for driving an antenna, and comprising a driving means adapted to drive said antenna with a driving signal and a modulation means having an input adapted to receive a transmission data signal, a data identification means adapted to identify a level change in said transmission data signal present on said input and adapted to control duty cycle of said driving signal, and wherein said data identification means is further adapted to provide a timed increase of duty cycle of said driving signal when said data identification means identifies a level change in said transmission data.

The term "system" is in this context to be construed as a transmission system or driving system for a transmitter or a transmitter per se.

The system according to the first aspect of the present invention thus provides simple means for handling a faster transmission rate, without significant increase in power consumption. The power consumption concern is particularly relevant in case the system is a battery driven device such as a headphone, headset or hearing aid.

The driving signal according to the first aspect of the present invention may comprise a general duty cycle in the range between 10 and 40%, such as 25%. The duty cycle is advantageously kept low so as to preserve power. The driving signal may further comprise a level change duty cycle of 50% during a level change in the transmission data. Hence the data identification means may increase the duty cycle of the driving signal from 25 to 50% when the data identification means identifies a level change, and this increased duty cycle is maintained a timed period.

The timed increase according to the first aspect of the present invention may be determined by the system in accordance with bit transmission period and transmission clock signal period. Further the timed increase may be defined by the system between 1 to 50 transmission clock signal periods, such as 10, 20, 30, or 40. The timed increased may further be defined by the system as a function of transmission data signals previously received by the modulation means. Hence the timed increase may be defined as a constant time period or defined as a function of the transmission data previously transmitted by the system. The latter learning function presents further advantages of the invention since the power consumption is controlled relative to the data type.

The modulation means according to the first aspect of the present invention may comprise a pulse-width modulation unit applying digital amplitude modulation such as pulse amplitude modulation, amplitude on-off keying, or amplitude shift keying with on-off keying. Hence a number of modulation techniques may be implemented in the system to accomplish a wide variety of modulation requirements.

The antenna according to the first aspect of the present invention may comprise an inductive coupler. The inductive coupler may comprise an inductor, a capacitor, a resistor or any combination thereof. The inductive coupler is particularly advantageous for low-power/short ranged communication methods such implemented for binaural communication in a hearing aid set or between a hearing aid and an accessory device.

The driving means according to the first aspect of the present invention may be adapted to drive said antenna differentially.

The data identification means according to the first aspect of the present invention may comprise a latching means adapted to store level of said transmission data of previous bit period, a comparator adapted to compare said stored level of the transmission data of previous bit period and level of the transmission data of present bit period, and a duty cycle controlling means adapted to control duty cycle of said modulation means. The data identification means may be implemented integrally with the modulation means. The latching means may comprise a flip-flop such as a D-type flip-flop and the comparator may comprise an exclusive-OR-gate.

The above objects, advantages and features together with numerous other objects, advantages and features, which will become evident from below detailed description, are obtained according to a second aspect of the present invention by a method for driving an antenna, and comprising driving said antenna with a driving signal, inputting a transmission data signal to an input of a modulation means, identifying a level change in said transmission data signal present on said input, controlling duty cycle of said driving signal, and providing a timed increase of duty cycle of said driving signal when identifying a level change in said transmission data.

The method according to the second aspect of the present invention may incorporate any of the features of the system according to the first aspect of the present invention.

The above objects, advantages and features together with numerous other objects, advantages and features, which will become evident from below detailed description, are obtained according to a third aspect of the present invention by use of said system for driving an antenna according to the first aspect of the present invention in a set of hearing aids or a hearing aid accessory.

The use according to the third aspect of the present invention may incorporate any of the features of the system according to the first aspect of the present invention and/or the method according to the second aspect of the present invention.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawing, wherein.

DETAILED DESCRIPTION OF PREFERRED EMBODIMENTS

In the following description of the various embodiments, reference is made to the accompanying figures, which show by way of illustration how the invention may be practiced. It is to be understood that other embodiments may be utilized and structural and functional modifications may be made without departing from the scope of the present invention.

Figure 1:
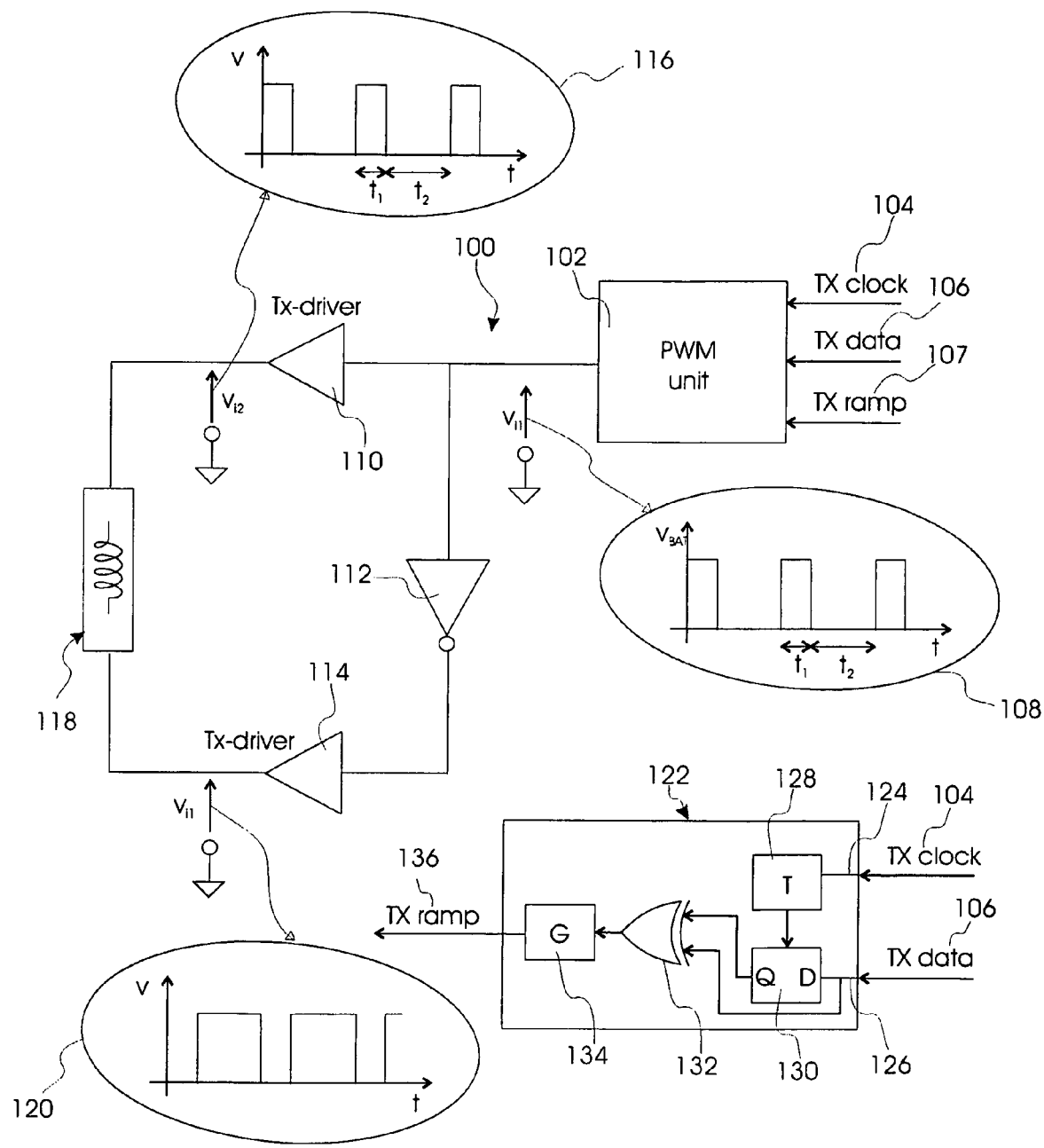
FIG. 1, shows a block diagram of an induction transmitter according to a first embodiment of the present invention.
Figure 2A:
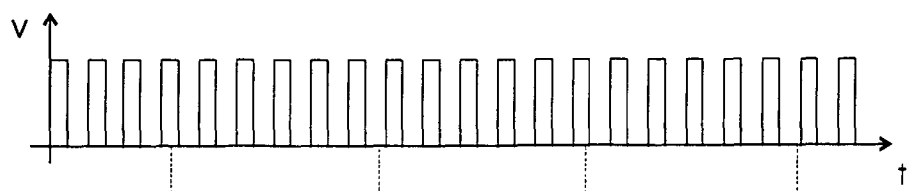
FIGS. 2a and 2b, show graphs of transmission clock signal and transmission data signal according to the first embodiment of the present invention.
Figure 2B:
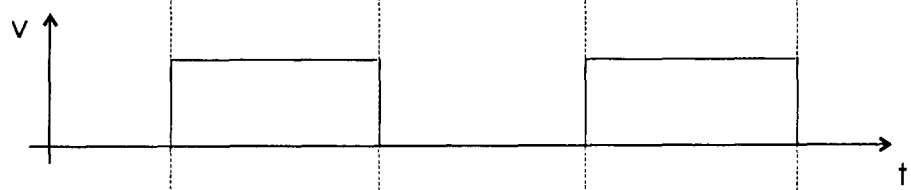

FIG. 1, shows a block diagram of a transmitter 100 according to a first embodiment of the present invention. The transmitter 100 comprises a pulse-width-modulator (PWM) unit 102 having a first input for receiving a transmission clock signal 104, as shown in FIG. 2a, having a second input for receiving a transmission data signal 106, as shown in FIG. 2b, and having a third input 107 for receiving a control or ramp signal for changing duty cycle of a pulse width modulated signal 108 when a transmission data signal 106 is present on the second input.

In an alternative embodiment of the system the PWM unit 102 comprises an internal DC ramping element controlling the duty cycle of the pulse width modulated signal 108.

The PWM unit 102 generates the pulse width modulated signal 108 as shown in associated graph. The pulse width modulated signal 108 has a duty cycle defined by positive pulse width ($t_1$) relative to total period of the pulse signal ($t_1+t_2$).

In the first embodiment of the present invention a "zero" bit is indicated by turning off the transmitter (zero amplitude) during a bit period, and a "one" bit is indicated by transmitting a signal with a fixed amplitude during a bit period. As is clear to the skilled person other level combinations are possible.

The pulse width modulated signal 108 is forwarded directly to a first driver 110 and, in addition, through an inverter 112 to a second driver 114. The first driver 110 thus presents a first driving signal 116 to an antenna 118 and the second driver 114 thus presents a second driving signal 120 to the antenna 118. The second driving signal 120 is inverted relative to the first driving signal 116.

The antenna 118 comprises an inductor, a capacitor, a resistor, or any combination thereof. The antenna 118 may obviously comprise a plurality of inductors, capacitors, resistors or any combination thereof.

In general, the duty cycle of a PWM unit 102 is kept low during steady levels of a bit period in order to preserve power, normally between 10 to 40%, for example 25%. That is, the positive part of the pulse width modulated signal 108 is a quarter of the period of the pulse width modulated signal 108. Obviously, the duty cycle during the steady levels of a bit period in a transmission may be kept even lower than 10%, however, experience has shown that quality and efficiency of the transmission is optimum in the range between 10 to 40%.

However, when the PWM unit 102 according to the first embodiment of the present invention receives a control signal on the third input 107 and a transmission data signal 106 is present on the second input, the PWM unit 102 initiates a timed pre-emphasis duty cycle of 50% so that the response time during level changes in the transmission data signal 106 is improved. This is, particularly, advantageous since the bandwidth limitation of the antenna is overcome to allow higher transmission rates.

In an alternative embodiment, an internal DC ramping element in the PWM unit 102 identifies these level changes in the transmission data signal 106, and the PWM unit 102 initiates a timed pre-emphasis duty cycle of 50% to improve the response time during level changes.

The timed pre-emphasis duty cycle of the system 100 is programmable so that effectively an appropriate timed increase of the duty cycle may be selected in accordance with bit period length as well as clock period. In the system 100 according to the first embodiment of the present invention the timed pre-emphasis duty signal is programmed to last for about 3 to 8 clock periods.

The control signal provided on the third input 107 of the PWM unit 102 is generated by a level detection unit 122 having a first input 124 for receiving the transmission clock signal 104 and a second input 126 for receiving the transmission data signal 106. The level detection unit 122 comprises a time divider 128 receiving the transmission clock signal 104 and providing a bit period signal to a latch 130, such as a D-flip-flop. The latch 130 receives the transmission data signal 106 and stores the transmission data signal 106 for a bit period in accordance with the bit period signal. The output (Q) of the latch 130 i.e. the stored previous bit of the transmission data signal 106 is forwarded to a comparator unit 132 together with the present bit of the transmission data signal 106. The comparator unit 132 compares the present bit and the previous bit, and in case the present and previous bits have different values the comparator unit 132 sets a flag. The comparator unit 132 may be implemented as an exclusive-OR-gate.

The level detection unit 122 may further comprise a duty cycle controller 134, which receives the flag from the comparator unit 132, generates a control signal 107 accordingly, and forwards this control signal 107 to output 136 of the level detection unit 122. The output 136 is connected to the third input 107 of the PWM unit 102. The duty cycle controller 134 may be implemented as a buffer or the flag may be directly forwarded to the PWM unit 102.

In an alternative embodiment of the system 100 the level detection unit 122 is integrally implemented in the PWM unit 102.

Figure 3A:
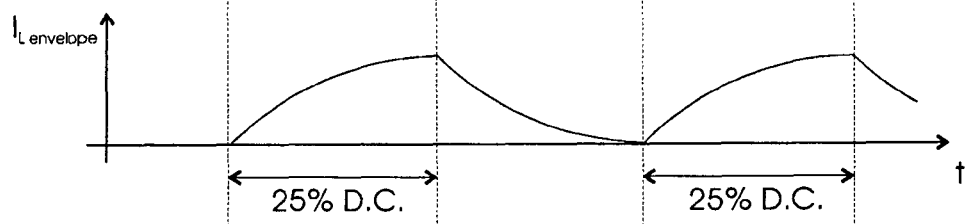
FIGS. 3a and 3b, show graphs of envelope of induction current according to a prior art transmitter, and of envelope of induction current according to the first embodiment of the present invention.

FIG. 3*a*, shows a graph of envelope of induction current (IL envelope) in the antenna 118 relative to the transmission clock and transmission data signals 104 and 106, respectively. The graphs shows how the antenna 118 reacts to the transmission data signal 106 when the PWM unit 102 operates with a duty cycle of 25%. Further, it is clear from FIG. 3*a* that some of the information in the transmission data signal 104 is removed due to the slow response cause by the 25% duty cycle.

Figure 3B:
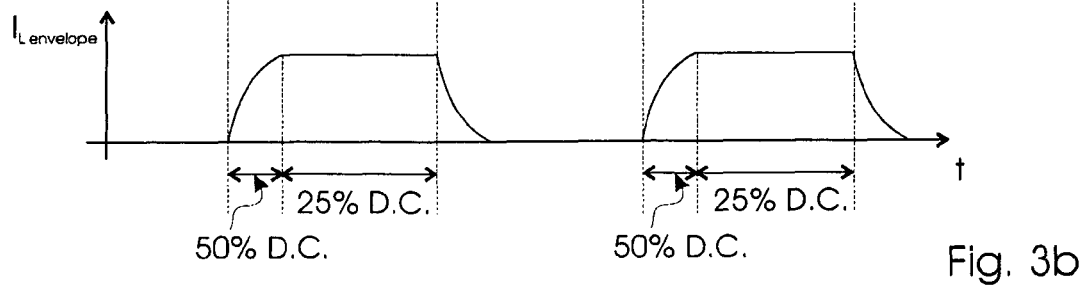

FIG. 3*b*, on the other hand shows a graph of envelope of induction current (IL envelope) in the antenna 118 according to the present invention. When the PWM unit 102 identifies that a data sequence is to be transmitted, the PWM unit 102 initiates a pre-emphasis duty cycle of 50% for a first part of the transmission data signal 106 thereby increasing reaction time of the antenna 118 and reducing the loss of information.

Hence a solution is obtained, which significantly improves the bandwidth of the transmitter 100 while the power consumption is kept at a minimum.

The invention claimed is:

1. A system for driving an antenna, and comprising a driving means adapted to drive said antenna with a driving signal and a modulation means having an input adapted to receive a transmission data signal, a data identification means adapted to identify a level change in said transmission data signal present on said input and adapted to control duty cycle of said driving signal, and wherein said data identification means is further adapted to provide a timed increase of duty cycle of said driving signal when said data identification means identifies a level change in said transmission data.

2. A system according to claim 1, wherein said driving signal comprises a general duty cycle in the range between 10 and 40%, such as 25%.

3. A system according to any of claims 1 to 2, wherein said driving signal further comprises duty cycle of 50% during a level change in said transmission data.

4. A system according to claim 1, wherein said system is adapted to determine timed increase in accordance with bit transmission period and transmission clock signal period.

5. A system according to claim 1, wherein said timed increase is programmable in a range between 1 to 50 transmission clock signal periods, such as 10, 20, 30, or 40.

6. A system according to claim 1, wherein said system is adapted to define timed increase as a function of transmission data signals previously received by said modulation means.

7. A system according to claim 1, wherein said modulation means comprises a pulse-width modulation unit applying digital amplitude modulation such as pulse amplitude modulation, amplitude on-off keying, amplitude shift keying with on-off keying, or any combination thereof.

8. A system according to claim 1, wherein said antenna comprises an inductive coupler.

9. A system according to claim 8, wherein said inductive coupler comprises an inductor, a capacitor, a resistor or any combination thereof.

10. A system according to claim 1, wherein said driving means is adapted to drive said antenna differentially.

11. A system according to claim 1, wherein said data identification means comprises a latching means adapted to store level of said transmission data of previous bit period, a comparator adapted to compare said stored level of the transmission data of previous bit period and level of the transmission data of present bit period, and a duty cycle controlling means adapted to control duty cycle of said modulation means.

12. A method for driving an antenna, and comprising driving said antenna with a driving signal, inputting a transmission data signal to an input of a modulation means, identifying a level change in said transmission data signal present on said input, controlling duty cycle of said driving signal, and providing a timed increase of duty cycle of said driving signal when identifying a level change in said transmission data.

13. A use of said system for driving an antenna according to claim 1 in a set of hearing aids or a hearing aid accessory.

* * * * *